United States Patent [19]

Rockey

[11] 3,714,291
[45] Jan. 30, 1973

[54] NOVEL POLYESTER RESINS CONTAINING SPIROACETAL UNITS

[75] Inventor: Kenneth William Rockey, Cookham, Berkshire, England

[73] Assignee: Albright & Wilson Limited, Oldbury, near Birmingham, Warwickshire, England

[22] Filed: Aug. 14, 1970

[21] Appl. No.: 63,937

[52] U.S. Cl. .............................. 260/861, 260/75 UA
[51] Int. Cl. ........................ C08f 21/00, C08g 17/10
[58] Field of Search .......................... 260/861, 75 UA

[56] References Cited

UNITED STATES PATENTS 2,945,008  7/1960  Caldwell et al. ......................... 260/75
3,287,320  11/1966  Leech et al. ............................. 260/75

Primary Examiner—William H. Short
Assistant Examiner—E. Nielsen
Attorney—Herbert H. Goodman

[57] ABSTRACT

The invention provides a cured polyester resin consisting of a co-polymer of at least one dicarboxylic acid and at least one dihydroxy alcohol wherein a part of the dicarboxylic acid and/or the dihydroxy alcohol is a compound of the formula:

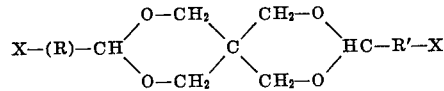

wherein each of R,R' is a divalent organic group and each X is a carboxyl group or acid forming derivative thereof or a hydroxyl group, the said polyester containing a proportion of ethylenically unsaturated linkages being cured by cross linking with an ethylenically unsaturated compound such as styrene.

16 Claims, No Drawings

NOVEL POLYESTER RESINS CONTAINING SPIROACETAL UNITS

The present invention relates to novel polyester resins of the ethylenically unsaturated type.

It is well known to react together dicarboxylic acids, such as phthalic and glycols such as ethylene glycol to form a polyester, for example of the fiber forming type. It is also known to include a proportion of ethylenically unsaturated material, such as maleic acid, among the reagents so as to form an unsaturated polyester. Unsaturated polyesters may be cured with styrene or similar vinylic compounds to form rigid resins which have the advantage of a hard surface. One factor which has hitherto tended to restrict the use of cured polyester resins, however, is their brittleness.

We have now discovered a novel ingredient for incorporation in unsaturated polyester compositions which provides cured resins having improved flexibility and reduced brittleness.

The present invention provides an ethylenically unsaturated co-polymer of at least one dicarboxylic acid and at least one dihydroxy alcohol, wherein a part of the dicarboxylic acid and/or the dihydroxy alcohol is a compound of the formula:

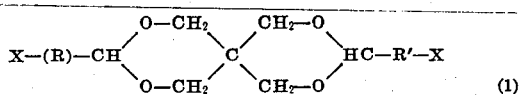
(1)

wherein each of R,R' is a divalent organic group and each X is a carboxyl group or ester forming derivative thereof or a hydroxyl group.

The invention further provides resins comprising a polyester of the invention cured with a vinylic compound.

The polyester resins of the present invention may conveniently be prepared by reacting together one or more dicarboxylic acids, acid anhydrides, acid chlorides or alkyl esters, and one or more dihydroxy alcohols. Hereinafter, reference to the use, as reagent in the preparation of unsaturated polyesters, of dicarboxylic acids is to be construed as including a reference to such derivatives of the dicarboxylic acids as are condensible with dihydroxy alcohols to form polyesters, for example anhydrides, acid chlorides and transesterifiable esters, such as methyl esters or other esters in which the alcoholic moiety is more volatile than the dihydroxy alcohol. Preferably the dicarboxylic acid is an alkyl, cycloalkyl, aryl or aralkyl dicarboxylic acid or a halogenated derivative thereof. In general it is preferred to use acids containing from 3 to 20, preferably four to 10 carbon atoms. The dicarboxylic acid reagent is preferably a mixture of fumaric or maleic acid, phthalic acid and a compound of formula (1) wherein X is a carboxyl group or esterifiable derivative thereof. Other dicarboxylic acids which may be present as, or as part of, the acid reagent include tetrahydrophthalic acid, endomethylene tetrahydrophthalic acid, sebacic acid, adipic acid, azelaic acid, malonic acid, cyclohexane dicarboxylic acid, terepthalic acid, isophthalic acid, tetrachlorophthalic acid, hexachloroendomethylenetetrahydrophthalic acid, acid and succinic acid.

The dihydroxy alcohol is preferably ethylene or propylene glycol, or may include unsaturated glycols such as butene - 1, 4 - diol, polyglycols containing 2 to 50 and preferably 2 to 5 alkylene - oxy units e.g. diethylene or triethylene glycol, neopentyl glycol, butane - 1,2 - diol, butane - 1,3 diol, butane - 1,4 - diol, butane - 2,3 - diol, diols of the formula:

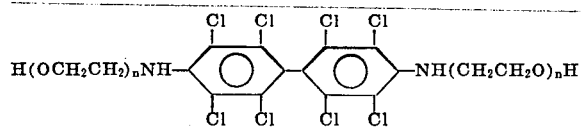

where each $n$ is from 1 to 10; or of the formula:

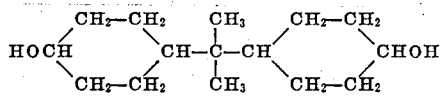

and compounds of the formula 1 wherein X is a hydroxyl group. The alcoholic reagent may also contain a small proportion of polyhydroxy alcohols such as glycerol, trimethylol propane or pantaerythritol. In addition a minor proportion of monofunctional carboxylic acid or alcohol may be included as a chain terminator, e.g. acetic acid, benzoic acid, lauric acid, myristic acid, lauryl alcohol, cetyl alcohol benzyl alcohol.

The compounds of formula 1 are spiroacetals which may for example be obtained by reacting pentaerythritol either with an aldehyde of the formula XRCHO where X has the same significance as hereinbefore, or with an aldehyde of the formula NC–R–CHO and hydrolyzing the nitrile group to form a carboxyl group. Preferably R is a divalent hydrocarbon group for example: a saturated hydrocarbon group having from 1 to 20 and preferably two to 12 carbon atoms such as a methylene, ethylene or propylene group, or an α,ω substituted pentane, hexane or heptane group; a cycloaliphatic group such as a cyclohexyl group; a divalent aryl group such as an o, m or preferably p phenylene group; an alkaryl group such as a p-benzyl or ethyl phenyl group; or an olefinic group such as a butene group. The group R may also comprise an alkyl polyoxyalkylene or polyoxyalkylene carboxylate group. Examples of suitable compounds of the formula 1 include: R=—CH$_2$—CH$_2$—, X=—COOH; R=—C$_6$H$_4$—, X=COOMe; R=—(CH$_2$CH$_2$O)$_3$CH$_2$CH$_2$ —, X=OH; R=—CH$_2$CH$_2$CO(OCH$_2$CH$_2$)$_3$-, X—OH; and R=—CH$_2$CH=CH CH$_2$—, X=—COC. A preferred compound is I (R= —(CH$_2$)$_2$—, X= —COOMe).

The alcoholic reagents are preferably employed in stoichiometric excess, e.g. up to 50 percent molar excess. Preferably the molar proportion of ethylenically unsaturated acid and/or alcohol included in the reagents is from 25 to 75 percent e.g. from 35 to 55 percent most preferably from 45 to 55, based on the total molar proportion of acid. The proportion of spiroacetal of formula 1 may be from 1 to 50 percent and preferably from 5 to 25 percent e.g. from 10 to 15 percent based on the total molar proportion of dicarboxylic acid.

Preferably the acidic reagents and the alcoholic reagents are heated together at a temperature sufficient to form a polyester but not sufficient to cause charring. Conveniently a hydrocarbon solvent may be present, and especially one that promotes azeotropic distillation of water, e.g. xylene. Typically the mixture is heated at temperatures between 100° and 200°C. Preferably the mixture is heated until a substantially neutral polyester has been formed. The polyester may be mixed with suitable additives e.g. antioxidants such as toluhydroquime, tertiary butyl catechol.

The polyester may be cured after mixing with from 0.5 to 2.5 moles e.g. from 1 to 2 moles, per equivalent of ethylenic unsaturation, of a vinylic material, preferably styrene. Other vinylic curing materials include methacrylic acid and its esters, diallyl phthalate, triallyl cyanurate, vinyl chloride and vinyl acetate. The mixtures may be cured for example by any conventional method, including heating with benzoyl peroxide, or cold curing with methyl ethyl ketone peroxide and cobalt naphthenate. The cured resin may be post-cured at elevated temperatures.

Cured resins according to our invention are useful for bonding fibers, such as glass fiber, carbon fiber, asbestos or other reinforcing fiber especially in the construction of laminates of improved impact strength e.g. for use in the building, boat building and vehicle building industries. They are especially valuable for providing surface layers e.g. gel coats. Such coats may be applied before during or after the lay up of the laminate. The compositions are also useful as sealants. Gel coats may be applied by brushing, spraying or dipping. The resins of our invention are also of use for a vaiety of other surface layers and finishes, e.g. in paints and varnishes which are cured to provide a resinous coating.

The invention is illustrated by the following examples: In each example a spiroacetal of the formula:

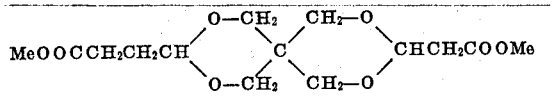

was heated with maleic acid, phthalic acid and ethylene glycol at 170°C. The temperature was maintained between 160° and 170°C until a 90 percent decrease in acid value had been achieved. The temperature was then allowed to fall to 100°C, whereupon solid toluhydroquinone was added, followed by styrene, with stirring, The resin was cooled for 1 hour and cured by adding 2 percent by weight of a 50 percent solution of benzoyl peroxide and heating for 16 hours at 80°C. The details were recorded in the following table:

|  |  | Example 1 | Example 2 | Example 3 |
|---|---|---|---|---|
| Spiro acetal (mole%) |  | 10 | 15 | 25 |
| Phthalic Anhydride | (") | 40 | 35 | 25 |
| Maleic " | (") | 50 | 50 | 50 |
| Ethylene Glycol | (") | 100 | 100 | 100 |
| Styrene | (") | 50 | 50 | 50 |
| Toluhydroquinone (p.p.m.) |  | 300 | 300 | 300 |
| Acid value (uncured) m.g. KOH/gm |  | 39 | 38 | 54 |
| Color (uncured) on Gardner scale |  | 6-7 | 4-5 | 6-7 |
| Deflection Temp. (cured) ASTM-D 648 |  | 53°C | 40°C | 20°C |
| Barco Hardness | (") | 86 | 83 | 48 dropping to 1 |
| Flexural Modulus | (") | 300,000 | 243,000 | 32,000 |
| Volume Resistivity | (") ohm.cm. | 1.2×10" | 2.9×10" | 7.2×10" |
| H₂O Absorption in 24 hours B.S.— 2782-MGO2G |  | 22 mg. | 27 mg. | 119 mg. |

We claim:

1. A curable composition for use in the preparation of cross-linked polyester resins having improved flexibility which consists essentially of
   a. an ethylenically unsaturated linear polyester, and
   b. from 0.5 to 2.5 moles of a liquid vinylic curing agent per equivalent of ethylenic unsaturation in said linear polyester,
   said linear polyester comprising a copolymer of
   i. an ester-forming reagent selected from the group consisting of dicarboxylic acids, their acid anhydrides, their acid chlorides and their transesterifiable esters, and
   ii. from 100 to 150 percent molar based on the proportion of said ester forming reagent, of at least one dihydroxy alcohol,
   at least part of said ester forming reagent (i) and said dihydroxy alcohol (ii) consists of at least one compound selected from ethylenically unsaturated acids and alcohols in a proportion of from 25 to 75 molar percent based on the total molar proportion of said ester forming reagent and wherein at least part of said ester forming reagent and said dihydroxy alcohol consists of at least one spiroacetal compound of the formula

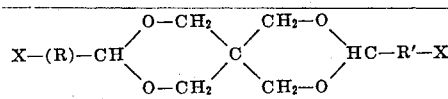

wherein each of R, R' is a divalent organic group selected from hydrocarbon, alkyl polyoxyalkylene and polyoxyalkylene carboxylate groups and each X is selected from hydroxyl groups and carboxylic acid, acid chloride, acid anhydride and transesterifiable ester groups, said spiroacetal being present in a proportion of from 1 to 50 percent molar based on the total molar proportion of said ester forming reagent.

2. A composition according to claim 1 wherein the dicarboxylic acid is selected from fumaric, maleic, phthalic, tetrahydrophthalic, endomethylenetetrahydrophthalic, sebacic, adipic, azelaic, malonic, cyclohexanedicarboxylic, terephthalic, isophthalic, tetrachlorophthalic, hexachloroendomethylenetetrahydrophthalic, and succinic acids.

3. A composition according to claim 1 wherein the dihydroxy alcohol is selected from ethylene glycol, propylene glycol, butene -1,4-diol, butane diols, polyglycols containing from 2 to 50 alkylene oxy units, diols of the formula

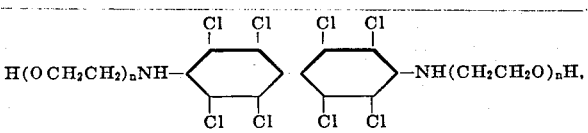

where each n is from 1 to 10 and diols of the formula:

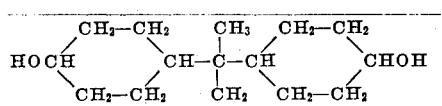

4. A composition according to claim 1 wherein there is additionally present a mono functional compound selected from mono carboxylic acids and mono hydroxy alcohols.

5. A composition according to claim 1 wherein the spiroacetal is a compound of the stated formula wherein R,R' are each selected from divalent aliphatic, cycloaliphatic, aromatic, olefinic, and alkaromatic hydrocarbon groups.

6. A composition according to claim 1 wherein the vinylic compound is selected from styrene, methracrylic and esters thereof, diallyl phthalate, triallyl cyanurate, vinyl chloride and vinyl acetate.

7. A cross-linked polyester formed by curing a curable composition according to claim 1.

8. A composition according to claim 1 wherein said linear polyester copolymer contains units which are residues from the polyesterification of at least one compound selected from the group consisting of glycerol, trimethylolpropane and pentaerythritol.

9. A composition according to claim 2 wherein said dihydroxyalcohol is selected from the group consisting of ethylene glycol, propylene glycol, butene -1,4-diol, butane diols, polyglycols containing from 2 to 50 alkylene oxy units, diols of the formula

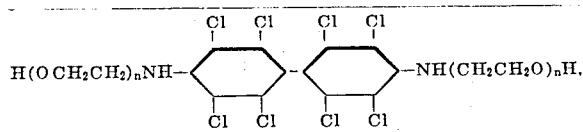

where each n is from 1 to 10 and diols of the formula:

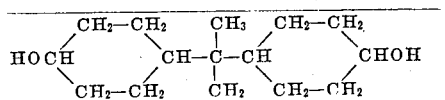

10. A composition according to claim 2 wherein said linear polyester copolymer contains units which are residues from the polyesterification of at least one compound selected from the group consisting of glycerol, trimethylolpropane and pentaerythritol.

11. A composition according to claim 3 wherein said linear polyester copolymer additionally contains a monofunctional compound selected from the group consisting of monocarboxylic acids and monohydroxy alcohols.

12. A composition according to claim 10 wherein R,R' are each selected from divalent aliphatic, cycloaliphatic, aromatic, olefinic and alkaromatic hydrocarbon groups.

13. A composition according to claim 12 wherein the vinylic compound is selected from the group consisting of styrene, methacrylic and esters thereof, diallyl phthalate, triallyl cyanurate, vinyl chloride and vinyl acetate.

14. A composition according to claim 7 wherein said curable composition is cured by addition of benzoyl peroxide at elevated temperatures.

15. A composition according to claim 7 wherein said curable composition is cured by a mixture of methyl ethyl ketone peroxide and cobalt naphthenate.

16. A composition according to claim 1 wherein said linear polyester polymer is a copolymer of at least one dicarboxylic acid selected from the group consisting of fumaric, maleic, phthalic, tetrahydrophthalic, endomethylenetetrahydrophthalic, sebacic, adipic, azelaic, malonic, cyclohexanedicarboxylic, terephthalic, isophthalic, tetrachlorophthalic, hexachloroendomethylenetetrahydrophthalic, and succinic acids, with at least one dihydroxyalcohol selected from the group consisting of ethylene glycol, propylene glycol, butene--1,4-diol, butane diols, polyglycols containing from 2 to 50 alkylene oxy units, diols of the formula

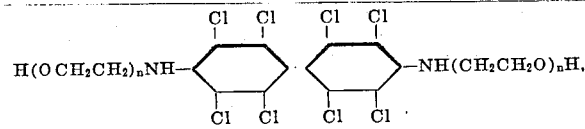

where each $n$ is from 1 to 10 and diols of the formula:

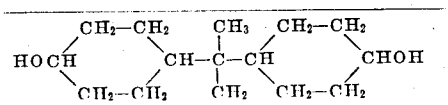

in the presence of at least one spiroacetal of the formula:

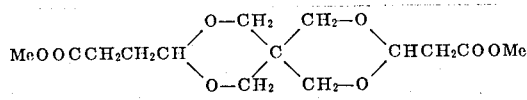

and the curing agent is styrene.

* * * * *

UNITED STATES PATENT OFFICE
CERTIFICATE OF CORRECTION

Patent No. 3,714,291          Dated January 30, 1973

Inventor(s) KENNETH WILLIAM ROCKEY

It is certified that error appears in the above-identified patent and that said Letters Patent are hereby corrected as shown below:

In the left column, on the title page, insert the following:

--Claims priority British Application No. 42027/69 filed August 22, 1969--.

Replace the formula which appears in Column 4, lines 60-63; Column 5, lines 30-33; and Column 6, lines 33-35; with the following formula:

Signed and sealed this 3rd day of July 1973.

(SEAL)
Attest:

EDWARD M. FLETCHER, JR.                Rene Tegtmeyer
Attesting Officer                       Acting Commissioner of Patents